May 6, 1930.  J. B. POL  1,757,844
LAWN MOWER AND ACCESSORY THEREFOR
Filed Sept. 20, 1928
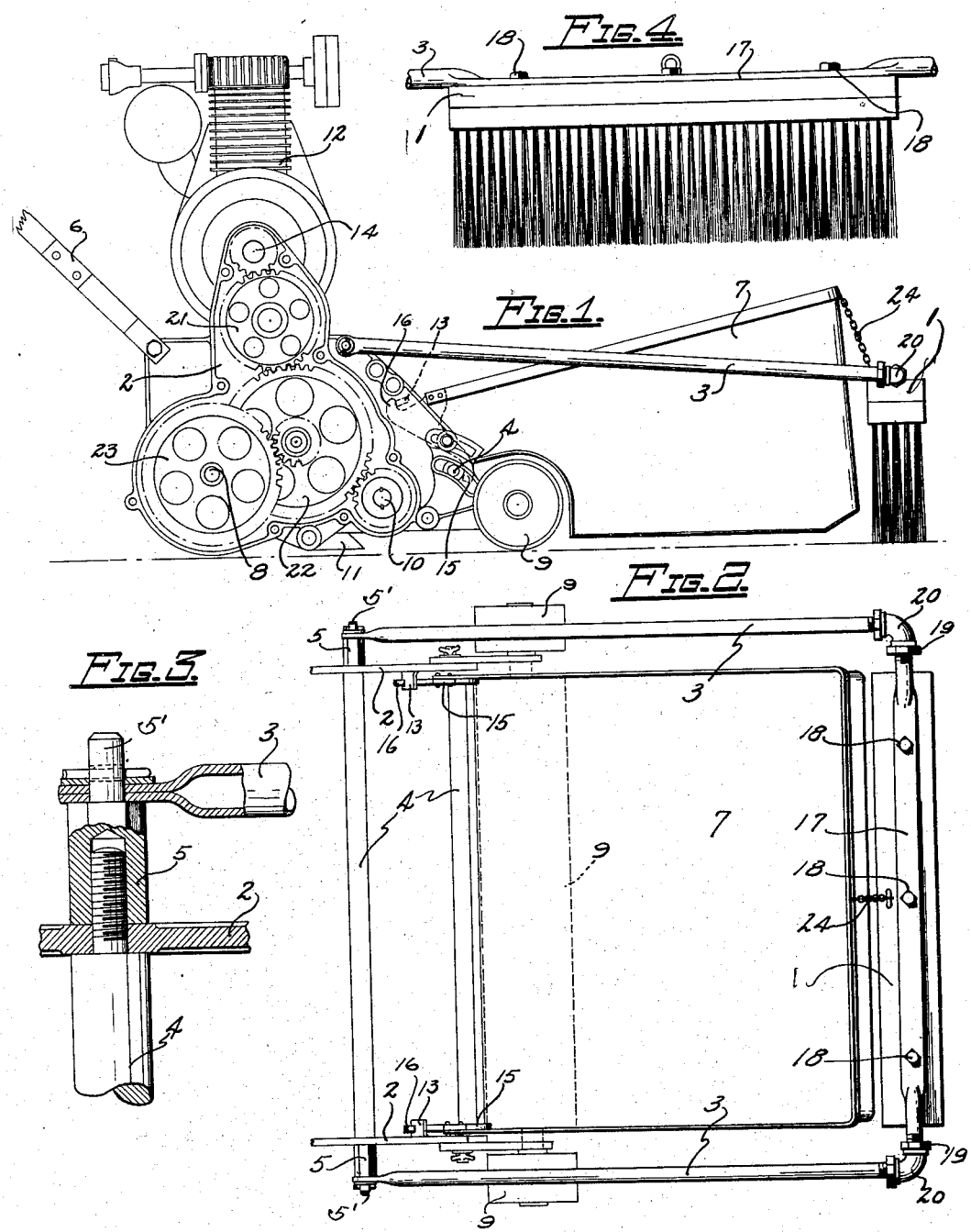
INVENTOR.
John B. Pol.
BY
Bottum, Hudnall, Lecher McNamara & Michael
ATTORNEYS Patented May 6, 1930

1,757,844

UNITED STATES PATENT OFFICE

JOHN BAPTISTE POL, OF RACINE, WISCONSIN, ASSIGNOR TO JACOBSEN MANUFACTURING CO., OF RACINE, WISCONSIN, A CORPORATION OF WISCONSIN

LAWN MOWER AND ACCESSORY THEREFOR

Application filed September 20, 1928. Serial No. 307,266.

This invention relates to lawn mowers and more particularly to means adapted to be attached to a power driven lawn mower for preparing matted or tangled grass so as to enable the mower to more effectively cut the same.

It has become desirable to use for putting greens on golf courses, as well as otherwise, a species of grass which has interweaving or entangling blades growing along and close to the ground. One variety of such grass is called "creeping bent". This grass grows closely along the surface of the ground in such manner that the blades become entangled and form a carpet like mat very desirable for certain purposes such as for putting greens. Because it grows along the ground instead of standing up therefrom, the grass lies below the range of action of the cutting mechanism of mowers and it is a practical impossibility to mow or cut the grass properly by mowers heretofore devised. Consequently the the blades of the grass frequently become so matted and entangled or compacted that the grass kills itself producing dead spots on the green or lawn. If kept in proper condition, however, this grass produces an excellent putting green.

One of the objects of the present invention is to facilitate the proper cutting of grass, especially grass of this kind by a conventional mower, whereby to maintain the grass or lawn in proper condition while reducing the cost of upkeep of putting greens or the like.

Another object of the invention is to provide a device operating to untangle the grass and elevate it up into the range of action of the cutting mechanism of the mower.

Another object is to provide a device which subjects the grass to the effective cutting action of the mower and which is adapted to be mounted on and driven by the mower with which it is used.

Another object of the invention is to provide a device having these advantages and capacities and which is of simple and durable construction, reliable and effective in operation and easy and comparatively inexpensive to manufacture and install.

Another object resides in the provision of an adjustable means for mounting the brush on the lawn mower so that the angle which the brush makes with the ground may be varied.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 shows a side view of a power driven lawn mower and brush means, one side cover plate of the mower being removed to show the driving arrangement;

Figure 2 is a plan view of a grass catcher, brushing means and portion of a lawn mower frame for supporting the brushing means and the grass catcher; and Figure 3 is a fragmentary plan view partly in cross section showing in detail the means used for supporting the brushing means on the frame of a known type of motor.

Fig. 4 is a detail view of the brush element.

Referring to the drawings more in detail, Figure 1 shows a power driven lawn mower of a known type. Such a motor is shown and described in co-pending application of John A. E. Carlson, Serial No. 198,317 filed June 13, 1927. No novelty is claimed for the mower per se in this application, but the mower is shown in order to more accurately disclose the present invention. In general, the lawn mower shown includes a frame work comprising side members 2 and cross rods 4, the frame work supporting an internal combustion engine 12 and driving mechanism for the traction shaft 8 and cutting reel shaft 10.

The driving mechanism consists of a gear train 21, 22 and 23 from the shaft 14 which is driven through suitable clutch mechanism (not shown) by the engine 12. The traction shaft 8 driven by the gear 23 carries a traction drum (not shown) for moving the mower. A pinion gear is splined to the shaft 10 and meshes with the gear 22 for causing rotation of the shaft 10 when desired. The shaft 10 carries a cutting reel adapted to co-act with ledger plate 11 for cutting the grass. Mounted at the forward end of the mower is an adjustable roller 9 which permits the mower to be raised and lowered with respect to the grass. A suitable grass catcher 7 is mounted on the mower in the usual manner. It has supporting pieces 15 resting on the cross rod 4 and formed at their upper ends with hooks 16 engaging lugs 13 on the side member 2. The mower has a suitable handle 6 for guiding the mower and controlling the engine and clutch mechanism in a known manner. This type of construction is well known and needs no further description here.

In general, the present invention proposes a disentangling and elevating element for the grass, preferable in the form of a combined brush and rake and means for mounting the combined brush and rake on the mower in such a manner that it will be driven forwardly and in advance of the cutting mechanism of the mower and yet will be free to ride up and down over the contour of the ground.

In the embodiment of the invention shown, a combined brush and rake 1 is provided and is fixed to a suitable mounting frame 3 pivotally supported on the side members 2 of the mower.

The combined brush and rake may comprise a head block in which stiff bristles are secured, each bristle comprising a plurality of spring steel ribbons. The head block may consist of a two part construction in which the steel ribbons may be secured by bending them into U-shape and securing the bent portion between the two halves of the block in a known manner. Preferably five ribbons are used in each bristle so that there are ten points in each bristle. This type of brush is sufficiently stiff and vigorous in its action to effectively engage and elevate the grass and yet has sufficient resiliency and flexibility to prevent digging action and to prevent jumping and chattering.

The supporting frame is U-shaped and is made up of rods and tubular members 3, elbows 20 and a flattened rod 17, which is secured to the brush 1 by any suitable means, as bolts 18. The rods 3 and 17 are screw threaded into the elbows 20 and are secured in position by lock nuts 19. It will be seen that this construction provides means for adjusting the angular position of the brush with respect to the supporting frame, the nuts 19 being capable of locking the brush in any desired angular position. Preferably the brush is adjusted so that the bristles are mounted at a slight angle to the vertical, the lower ends being slightly forward of the upper ends. It has been found that this position of the brush or rake is the most effective one for untangling the blades of grass.

As shown in detail in Figure 3, the ends of the U-shaped frame are provided with flattened portions having holes therein in which studs or trunnions 5′, provided on or integral with nuts 5, are mounted. The studs 5′ have holes therein for receiving a cotter pin to secure the nuts to the frame.

The frame and brush is mounted on the cross rods 4 of the mower. In mounting the frame, the end nuts which normally secure the rods 4 to the side members 2 are removed and the combined nuts and trunnions 5 substituted therefor. The nuts 5 thus secure the rods 4 to the side members 2 and pivotally secure the rods 3 of the U-shaped frame to the lawn mower.

From an inspection of Figure 1, it may be seen that the ends of the U-shaped frame which are secured to the mower are positioned slightly higher than the bar 17 on the brush. Because of this relative positioning when the mower is moved to push the brush or rake forwardly, the force transmitted to the brush has a small downward component which in addition to the weight of the brush causes it to ride over the grass with just the proper amount of scraping action.

A chain 24 may be provided for supporting the brush on the grass catcher. Normally the chain remains slack but whenever it is desired to remove the combined rake and brush from the ground, as for example, in turning the mower, the operator may do so by pressing downwardly on the handle 6, thus elevating the catcher 7 and brush 1 through the chain 24. In other words, the chain 24 provides means for limiting the downward swinging movement of the brush relative to the mower and toward the ground.

It is to be understood that the above description is taken only by way of illustration and as showing one modification of the invention. It is obvious that the brush may be used with other types of mowers and that other types of brushes than that described may be used, as for example, rotary brushes driven by power mechanism on the lawn mower.

I claim:

1. A device of the character described, comprising a lawn mower, a brush arranged in advance of the lawn mower, a floating mounting for the brush swingingly connected to the lawn mower and providing a propelling connection between the brush and the lawn mower while leaving the brush free to rise and fall, whereby the brush engages and follows the contour of the ground under the influence of gravity.

2. A device of the character described, comprising a lawn mower, a brush and a frame connected to the brush and pivotally connected to the lawn mower to provide a propelling connection between the mower and the brush while leaving the brush free to follow the contour of the ground.

3. A device of the character described, comprising a mower, a brush arranged in advance of the mower, a U-shaped frame having its transverse portions secured to the brush and having its side portions pivotally connected to the mower to provide a positive propelling connection between the brush and the mower while leaving the brush free to follow the contour of the ground under its own weight and under the weight of the frame.

4. A device of the character described, comprising a lawn mower, a brush and a frame connected to the brush and pivotally connected to the lawn mower to provide a propelling connection between the mower and the brush while leaving the brush free to follow the contour of the ground and means limiting the downward movement of the brush.

5. A device of the character described, comprising a lawn mower having a cross rod, a brush, a U-shaped frame member secured to the brush, and nuts threaded on the ends of the cross rod and having trunnions pivotally interconnected with the ends of the U-shaped frame member.

6. A device of the character described, comprising a mower, a brush arranged in advance of the mower, a frame having a mounting member pivotally supported on the lawn mower, a brush attaching member secured to the brush, and an adjustable connection between the outer attaching member and the mounting member of the frame whereby the angular position of the brush may be varied.

7. A device of the character described, comprising a lawn mower having cutting mechanism, a brush arranged in advance of the cutting mechanism and designed to engage the grass and prepare it for cutting, and a yieldable propelling connection between the brush and the mower for advancing the brush with the mower while allowing the brush to follow the contour of the ground.

8. A device for elevating grass up into the range of action of the cutting mechanism of a mower and comprising a brush and a swingable frame adapted to be connected to the mower and also connected to the brush to propel the brush in advance of the mower while permitting it to follow the contour of the ground.

9. A device for elevating grass up into the range of action of the cutting mechanism of a mower and comprising a brush having stiffly resilient bristles and a rigid frame having its forward end secured to the brush and its rear end adapted to be pivotally connected to the mower, said frame extending downwardly and forwardly from its point of connection with the mower to the brush to preclude swinging and chattering while insuring effective engagement of the brush with the grass.

In witness whereof, I hereto affix my signature.

JOHN BAPTISTE POL.